United States Patent [19]

Oosterling et al.

[11] 4,106,273
[45] Aug. 15, 1978

[54] MOWER

[75] Inventors: Pieter Adriaan Oosterling; Hendricus Cornelis van Staveren, both of Nieuw-Vennep, Netherlands

[73] Assignee: Multinorm, B.V., Nieuw-Vennep, Netherlands

[21] Appl. No.: 774,052

[22] Filed: Mar. 3, 1977

[30] Foreign Application Priority Data

Mar. 17, 1976 [JP] Japan .................. 51-02802

[51] Int. Cl.² ........................................... A01D 55/18
[52] U.S. Cl. ...................................... 56/295; 56/16.2
[58] Field of Search .................. 56/6, 192, 295, 16.2

[56] References Cited

U.S. PATENT DOCUMENTS

| 3,621,642 | 11/1971 | Leake, Jr. | 56/192 |
| 3,972,159 | 8/1976 | Oosterling et al. | 56/192 |
| 3,974,630 | 8/1976 | van der Lely | 56/295 |

Primary Examiner—Russell R. Kinsey
Attorney, Agent, or Firm—John P. Snyder

[57] ABSTRACT

A mower comprises a housing extending transversely of the direction of movement of the mower, wherein cutting members rotatably journalled on said housing each comprises one lower ring sweeping across the housing, an upper ring arranged above the lower ring and three cutters arranged at the circumference of the cutting member between the upper and lower rings each on one pin, while the lower ring of each cutting member is uncovered at the area of the path of each cutter of a neighboring cutting member. The upper ring is substantially triangular with rounded-off corners in which the cutters are fastened in order to reduce the risk of damage of the cutting member and to hold the paths of the undamaged cutters more constantly at the same level.

3 Claims, 7 Drawing Figures

MOWER

The invention relates to a mower comprising a housing extending transversely of the direction of movement of the mower, a plurality of cutting members rotatably journalled on said housing and a driving gear arranged inside said housing and adapted to drive the cutting members, each cutting member comprising at least one lower ring sweeping across the housing, an upper ring arranged above the lower ring and three cutters arranged at the circumference of the cutting member between the upper and lower rings each on one pin, the cutters of neighbouring cutting members being relatively off-set in the circumferential direction, whilst the lower ring of each cutting member is uncovered at the area of the path of each cutter of a neighbouring cutting member.

Such a mowing device is known. Therein each cutter is fastened around a pin which is firmly held in place, because both the top end and the bottom end of the pin are supported in a ring. The cutter surrounds the pin with such an amount of clearance that in the event of collision with a stone the cutter cannot only turn around the pin but can also move upwardly owing to the ample clearance so that damage of the mower is avoided. This ample clearance involves an undefined cutting level of the cutter. If in the known mower the cutter is fastened with a small amount of clearance between the rings, the risk is involved that at an impact on a stone the cutter may bend over upwardly and cut on in the deformed shape so that it repeatedly abuts against the upper ring, as a result of which not only the upper ring and the cutter but also, in particular, the driving gear of the cutting members are seriously damaged.

The invention has for its object to reduce the risk of damage of the cutting member and to hold the paths of the undamaged cutters more constantly at the same level, whilst the shape of the cutting member is such that the cutting member readily slides on beneath the cut crop. The crop must not or only hardly be displaced by the cutting member. For this purpose the upper ring is substantially triangular with rounded-off corners in which the cutters are fastened.

The aforesaid and further features of the invention will be described more fully hereinafter with reference to a drawing. In the drawing.

Figure 1:
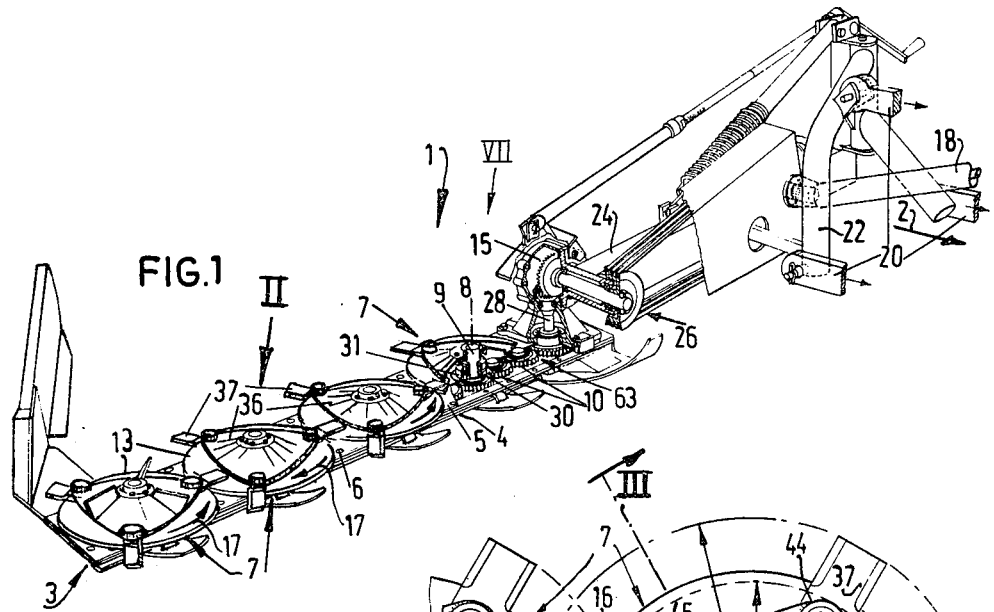
FIG. 1 is a perspective view partly broken away of a mower embodying the invention.

The mowing device 1 shown in FIG. 1 is connected via an auxiliary frame 24 with a framework 22 supported by suspension rods 20 of a tractor (not shown) and via a bevel gear wheel drive 15 and a rope drive 26 it is driven through a universal shaft 18 by the power take-off shaft of the tractor.

The mower 1 according to the invention comprises a housing 3 extending transversely of its direction intended of movement 2 and having the shape of a flat, elongated beam mainly comprising a channel 4 and a cover 5 secured thereto by bolts 6. The housing 3 is rotatably supports a plurality of cutting members 7 adapted to rotate about upright axes 8. The cutting members 7 are disposed near and above the housing 3 and are so rotated that the members of any adjacent pair are contrarotating as indicated by the arrows 17. Each cutting member 7 is rigidly connected by means of a shaft 9 with a gear 10 of a driving gear assembly 63 accommodated in the housing 3 and comprising a series of gears 10 and adapted to be driven via a shaft 28 by the bevel gear drive 15. The shaft 9 of each cutting member 7 is rotatably journalled in an upwardly extending collar 31 of the cover 5 by means of a bearing 30. Each cutting member 7 comprises an upper ring 36 fastened by screws 34 to a hub 35 and a lower ring 13 fastened below the former by bolts 14, between which rings three cutters 37 are fastened by means of a pin formed by a bolt 14 with said nut 33 countersunk in a cup 27 welded to the upper ring 36 by a weld 32. The cutter 37 is adapted to turn about a spacer ring 12, which is firmly clamped between the lower ring 13 and the upper ring 36, a small amount of clearance 19, for example, of 0.2 mm being left between the cutter 37 and the rings 13 and 36 to allow the cutter 37 to rotate. The lower ring 13 is fastened to the upper ring 36 solely by the bolts 14. The bolt 14 has a flat head 39 disposed in a recess 40 formed by an upwardly bulging portion 41 of the lower ring 13. The bolt 14 engages by a square collar 42 a correspondingly shaped hole 43 of the lower ring 13. The lower ring 13 has a circular circumference and sweeps over the housing 3 so that no stones can get jammed between the housing 3 and the lower ring 13. For this purpose the central, circular recess 38 of the lower ring 13 remains inside the front edge 23 and the rear edge 16 of the housing 3.

At the area of each path 29 of the cutter 37 of a neighbouring cutting member 7 the lower ring 13 of each cutting member 7 is not covered. For this purpose the upper ring 36 is cut off near the paths 29. The cutters 37 of neighbouring cutting members 7 are relatively off-set through an angle of 60° so that they will not touch one another, although the cutter paths overlap one another.

Figure 2:
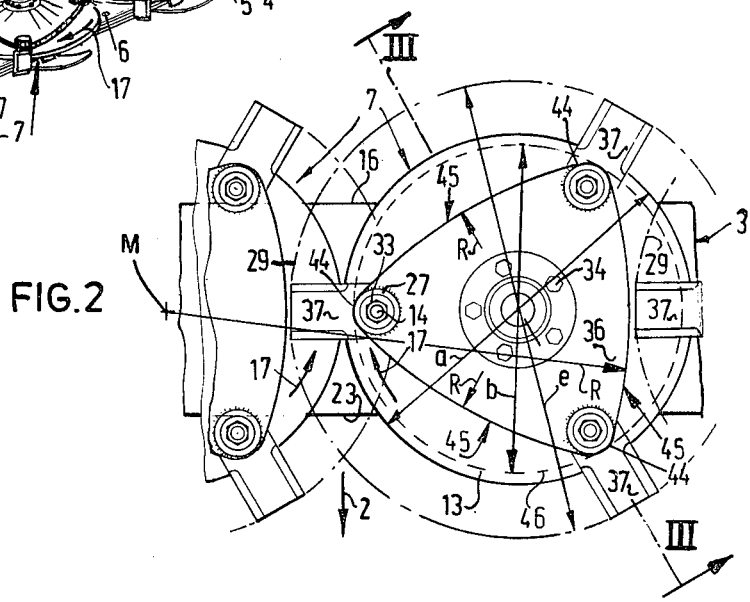
FIG. 2 is an enlarged plan view of detail II of FIG. 1 on an enlarged scale.

According to the invention the upper ring 36 has essentially the shape of a triangle having rounded-off corners 44, where the cutters 37 are secured. The three sides 45 of the upper ring 36 have a smooth flowing shape so that the cut crop will not be caught thereby. Thus a displacement of the crop in the circumferential direction of the cutting members 7 is avoided because each cutting member 7 moves below the cut crop without displacing it. The crop practically remains at the place of growth so that a regular, loose swath is left behind the mower, which is satisfactorily exposed uniformly to sun and wind. Moreover, waste of energy by displacing the crop is avoided. As shown in FIGS. 2, 4, 5 and 6 the smooth variation of the sides 45 can be obtained in various ways. As shown in FIG. 2, the three sides 45 preferably have each an outwardly curved, smooth shape, each having the shape of the arc of a circle having a radius R, the centre of curvature M being located in the direction of the opposite corner 44 outside the lower ring 13 and the upper ring 36 of the cutting member 7.

Figure 4:
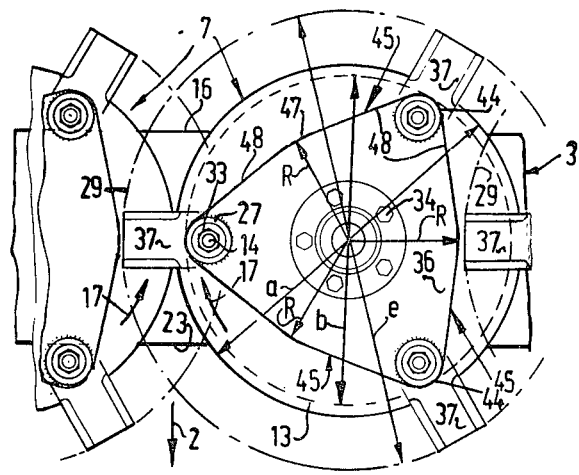
FIG. 4 is a plan view corresponding with FIG. 2 of a different embodiment of the device in accordance with the invention.

FIG. 4 shows that a curved line 47 for each side 45 joins two straight line portions 48 terminating in the round corners 44.

Figure 5:
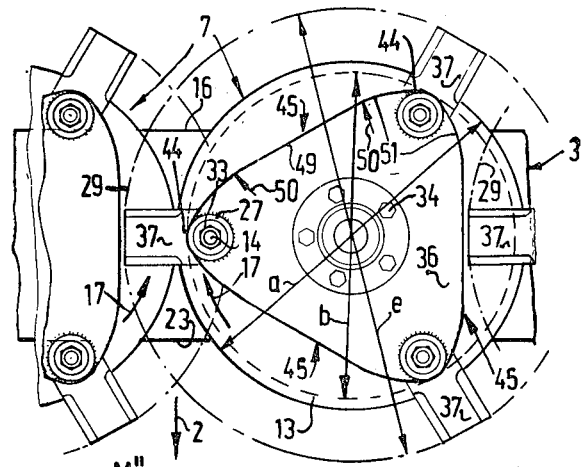
FIG. 5 is another plan view showing a still further embodiment of the invention.

In the cutting member 7 of FIG. 5 each side 45 has a straight central portion 49 joining the round corners 44 by two curved lines 51 having a large radius of curvature 50.

Figure 6:
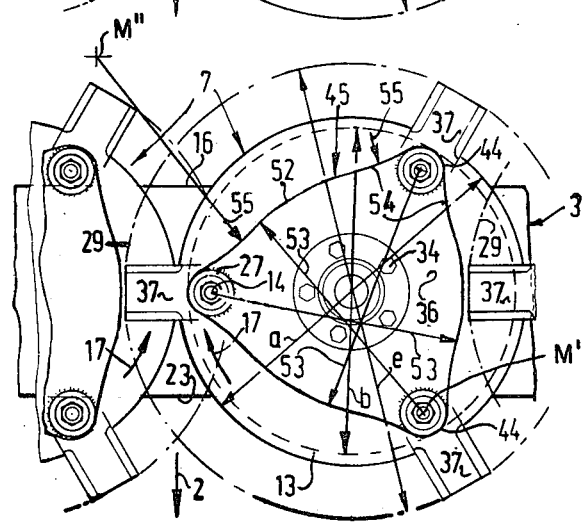
FIG. 6 is a further plan view showing still another embodiment of the invention.
Figure 7:
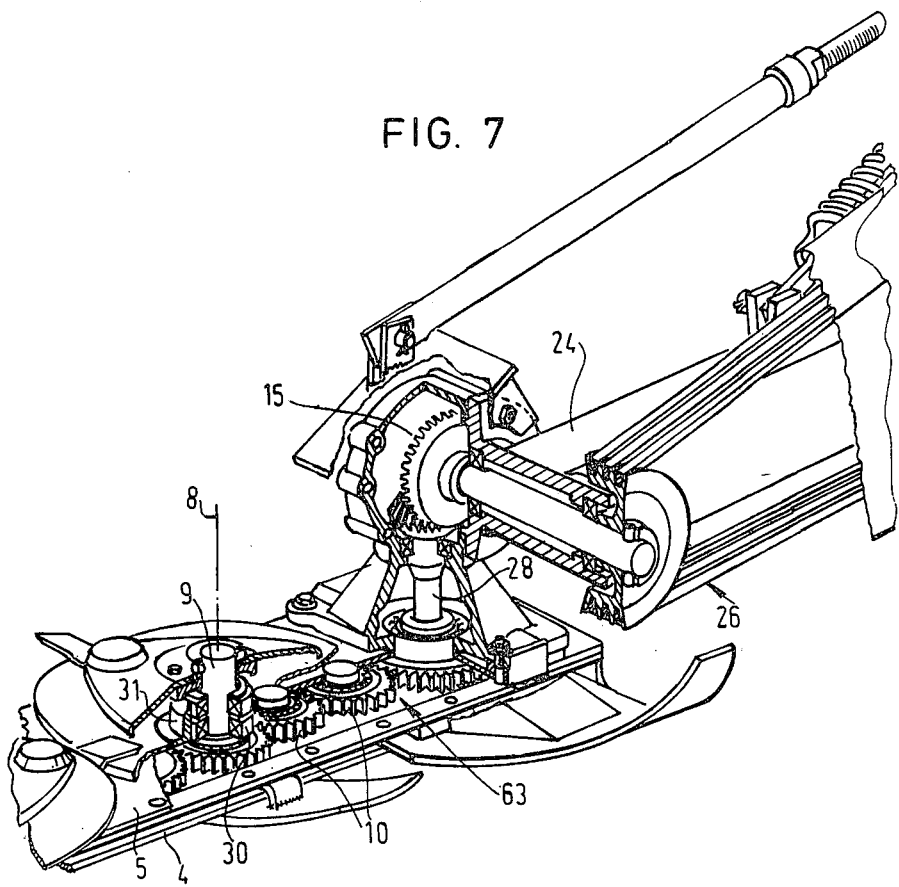
FIG. 7 is an enlarged view showing a portion of FIG. 1 to greater scale.

In the cutting member 7 of FIG. 6 each side 45 has an outwardly curved central portion 52 having a radius of curvature 53, whose center of curvature is at M' as indicated, and smoothly joining via two inwardly curved line portions 54 each having a large radius of curvature 55 whose center of curvature is at M" as indicated. The shape shown in FIG. 2, however, is by far preferred.

Figure 3:
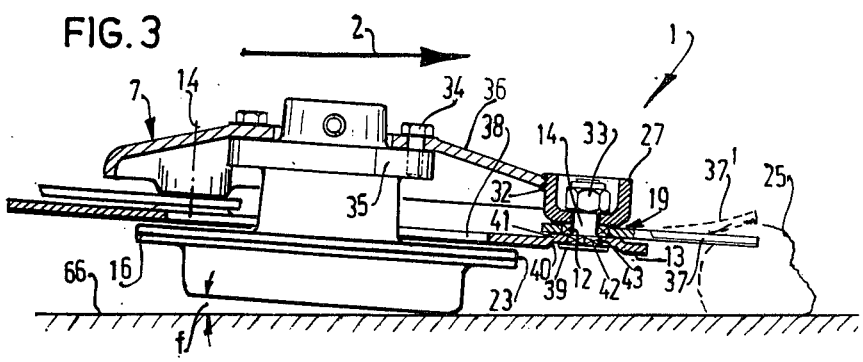
FIG. 3 is a sectional view taken on the broken line III in FIG. 2.

FIG. 3 shows that the upper ring 36 has the shape of an inverted dish, since the upper ring 36 is bent downwardly from the edge. As shown in FIG. 2, the upper ring 36 has an enveloping circle 46 having a diameter $b$, which is considerably smaller than the diameter $a$ of the lower ring 13.

FIG. 3 illustrates how the cutter 37 firmly clamped by means of a bolt 14 can deform into the shape indicated by broken lines by a collision with a stone 25. This damaged cutter 37' cannot touch a neighbouring cutting member 7 and will, therefore, not give rise to serious damage of the mower 1. The repair work only consists of the replacement of the cutter 37' by a new cutter 37.

In all embodiments shown the mower 1 has a low profile and the shape of the cutting members 7 is such that the mower 1 readily passes below the cut crop. The circumferential speed of the cutters 37 is very high, for example, about 80 ms/sec. with a circumference diameter $e$ of 45 to 50 cms.

During the mowing operation the mower is held in a slightly forwardly inclined position so that the cutting members 7 are at an angle $f$ to the ground surface 66.

What we claim is:

1. A mower comprising a housing extending transversely of the direction of movement of the mower, a plurality of cutting members rotatably journalled on said housing and a driving gear assembly accommodated within said housing and adapted to drive the cutting members, each cutting member comprising at least one lower ring sweeping over the housing, an upper ring arranged above the lower ring, and three pins extending between said upper and lower rings and circumferentially spaced therearound, and three cutters fastened each to a pin between the upper ring and the lower ring, the cutters of neighbouring cutting members being relatively off-set in the circumferential direction, whilst at the area of the path of each cutter of a neighbouring cutting member the lower ring of each cutting member is not covered, characterized in that the upper ring has essentially the shape of a triangle having rounded-off corners, in which the cutters are secured.

2. A mower as claimed in claim 1, characterized in that the three sides of the upper ring each have an outwardly curved, smoothly varying shape.

3. A mower as claimed in claim 2, characterized in that the three sides of the upper ring each have the shape of the arc of a circle whose centre of curvature is located in the direction of the opposite corner outwardly of the lower ring and the upper ring of the cutting member.

* * * * *

UNITED STATES PATENT AND TRADEMARK OFFICE
CERTIFICATE OF CORRECTION

PATENT NO. : 4,106,273
DATED : August 15, 1978
INVENTOR(S) : Pieter A. Oosterling et al It is certified that error appears in the above-identified patent and that said Letters Patent are hereby corrected as shown below:

On title page, priority data should read:

---[30] Foreign application priority data:

Netherlands 76.02802 of March 17, 1976---

Signed and Sealed this

Twentieth Day of February 1979

[SEAL]

Attest:

RUTH C. MASON
*Attesting Officer*

DONALD W. BANNER
*Commissioner of Patents and Trademarks*